United States Patent
Conete et al.

(10) Patent No.: US 6,398,483 B1
(45) Date of Patent: Jun. 4, 2002

(54) PROTECTION DEVICE FOR PROTECTING CONTROL MECHANISM OF INLET GUIDE-VANES OF TURBOJET ENGINE

(75) Inventors: Eric Conete, Cesson; François Marie Paul Marlin, Villiers sous Grez, both of (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/589,806

(22) Filed: Jun. 9, 2000

(30) Foreign Application Priority Data

Jun. 10, 1999 (FR) .............................. 99 07313

(51) Int. Cl.⁷ .............................................. F01D 21/00
(52) U.S. Cl. ........................... 415/9; 415/130; 415/160; 415/191
(58) Field of Search ............................. 415/9, 129, 130, 415/151, 159, 160, 191

(56) References Cited

U.S. PATENT DOCUMENTS

| | | | |
|---|---|---|---|
| 1,728,898 A | * | 9/1929 | Gross ............................ 415/9 |
| 4,040,766 A | * | 8/1977 | Sekido et al. ................... 415/9 |
| 4,299,534 A | * | 11/1981 | Yamane et al. ................. 415/9 |
| 4,695,220 A | | 9/1987 | Dawson |
| 4,720,237 A | * | 1/1988 | Weiner et al. ............... 415/150 |
| 4,867,636 A | | 9/1989 | Sauron et al. |

FOREIGN PATENT DOCUMENTS

| | | |
|---|---|---|
| FR | 1354691 | 1/1964 |
| GB | 989828 | 4/1965 |

OTHER PUBLICATIONS

Patent Abstracts of Japan, vol. 004, No. 025 (M–001), Mar. 5, 1980, JP 55 001475, Jan. 8, 1980.

* cited by examiner

*Primary Examiner*—Edward K. Look
*Assistant Examiner*—Ninh Nguyen
(74) *Attorney, Agent, or Firm*—Oblon, Spivak, McClelland, Maier & Neustadt, P.C.

(57) ABSTRACT

A protection device for protecting a control mechanism of inlet guide-vanes of a turbojet engine includes a narrowed section on a connecting rod. The connecting rod is for transmitting the movement of a spindle of a piston of the control mechanism or actuator to a control ring that directs all of the inlet guide-vanes. The narrowed section of the connecting rod is a frangible part.

14 Claims, 6 Drawing Sheets

PROTECTION DEVICE FOR PROTECTING CONTROL MECHANISM OF INLET GUIDE-VANES OF TURBOJET ENGINE

BACKGROUND OF THE INVENTION

CROSS-REFERENCE TO RELATED APPLICATIONS

This application relates to and claims priority, under 35 U.S.C. § 119, from French Patent Application No. 99 07313, filed on Jun. 10, 1999, the entire contents of which are hereby incorporated by reference herein.

1. Field of the Invention

The present invention generally relates to turbojet engines including inlet guide-waves having vanes at an angle which is controlled during operation of the turbojet engines and more particularly, to a protection device for protecting the control mechanism or control actuator which controls an orientation of the angle of the vanes.

2. Discussion of Background

When certain turbojet engines are used, such as those used in fighter planes, certain flying conditions impose stresses on the airflow at the turbojet engine intake. Indeed, under specific meteorological conditions and for given operating conditions of the turbojet engine phenomena occur that disturb the airflow at the turbojet engine intake, such as "surging". Phenomena of this kind mean that the actual instantaneous airflow at the turbojet engine intake is different from the theoretical airflow required at that particular instant for the preferred operating conditions of the turbojet engine. Phenomena of intense and violent aspirations then occur at the inlet guidevanes of the turbojet engine, particularly at its orientable vanes. This results in aerodynamic instability in the compressor.

Similarly, when the plane is stopped or flying at very low altitude the ingestion of objects or flying objects can cause major impact to one or more vanes. It then causes damage to or breaks one of the parts constituting the mechanical chain of the vanes. However, in most turbojet engines the mechanism chain is controlled by an actuator that operates with the fuel of the turbojet engine under pressure. Such an impact to one of the vanes could cause damage to the control actuator and a major fuel leak, either directly or indirectly due to one of the parts of the mechanism chain. Such an occurrence should be prevented in any event to avoid endangering any flight that uses one of these turbojet engines.

The aim of the invention is therefore to ensure flight safety of planes that use turbojet engines of this kind by protecting the fragile parts, such as the vane control actuator of the inlet guide-vanes.

Besides, U.S. Pat. No. 4,695,220 discloses a frangible mechanism system that limits the loads on each vane of the inlet guide-vanes of a turbojet engine in the event of foreign bodies being ingested. Each vane is fitted with a frangible part between the control lever and the inlet guide-vane control ring, which protects each vane when it is subjected to an impact. Once the frangible part has broken, the indentation in the ring limits the displacement of the vane control lever. Various damping systems are used, such as springs and elastomer materials, in the indentation of the ring to absorb the impact when the frangible part breaks.

The drawback of this type of solution is that it requires every vane to be fitted with a frangible part, which is a disadvantage in terms of construction, light and cost.

SUMMARY OF THE INVENTION

To overcome the above-described drawback, the main aim of the present invention is a protection device for protecting the control mechanism of the inlet guide-vanes at the entrance to a turbojet engine. The protection device comprises: a control actuator; a frangible transmission part activated by the control actuator; a control ring driven by the control actuator by means of the frangible transmission part; and a control lever for directing each of the inlet-guide vanes, wherein each control lever is activated by the control ring.

According to the present invention, the frangible transmission part is a single component and constitutes a link in the control mechanism positioned between the control actuator and the control ring.

In a preferred embodiment of the present invention, the frangible transmission part is a connecting rod. The connecting rod has a portion with a narrowed cross-section which is located between the control actuator and the control ring. Only one pivoting transmission part is used at the outlet of the actuator and the one pivoting transmission part is located before the connecting rod and is articulated around the actuator and the connecting rod.

In this case, it is advantageous to provide a protective part which is tubular so as to surround the portion of the connecting rod having the narrowed cross-section. This tubular protective part can advantageously take the form of a double-thickness thermoshrinkable sheath.

Also, the narrowed cross-section portion and the remainder of the connecting rod may be tube-shaped.

In another embodiment of the present invention, the frangible transmission part is a frangible bolt having a narrowed cross-section portion that is positioned in a yoke downstream of the pivoting transmission part.

In order to prevent the connecting rod, once broken, from damaging a mechanical part of the mechanism, particularly the actuator, it is very advantageous to fit an anti-deflection part to a downstream yoke of the pivoting transmission part and to cover the end of the connecting rod to prevent the connecting part from rotating at such an amplitude as to subject the actuator to an impact.

BRIEF DESCRIPTION OF THE DRAWING FIGURES

The present invention and its technical characteristics will be better understood from the following description of the preferred embodiments of the present invention.

DETAILED DESCRIPTION OF THE PREFERRED EMBODIMENTS

Figure 1:
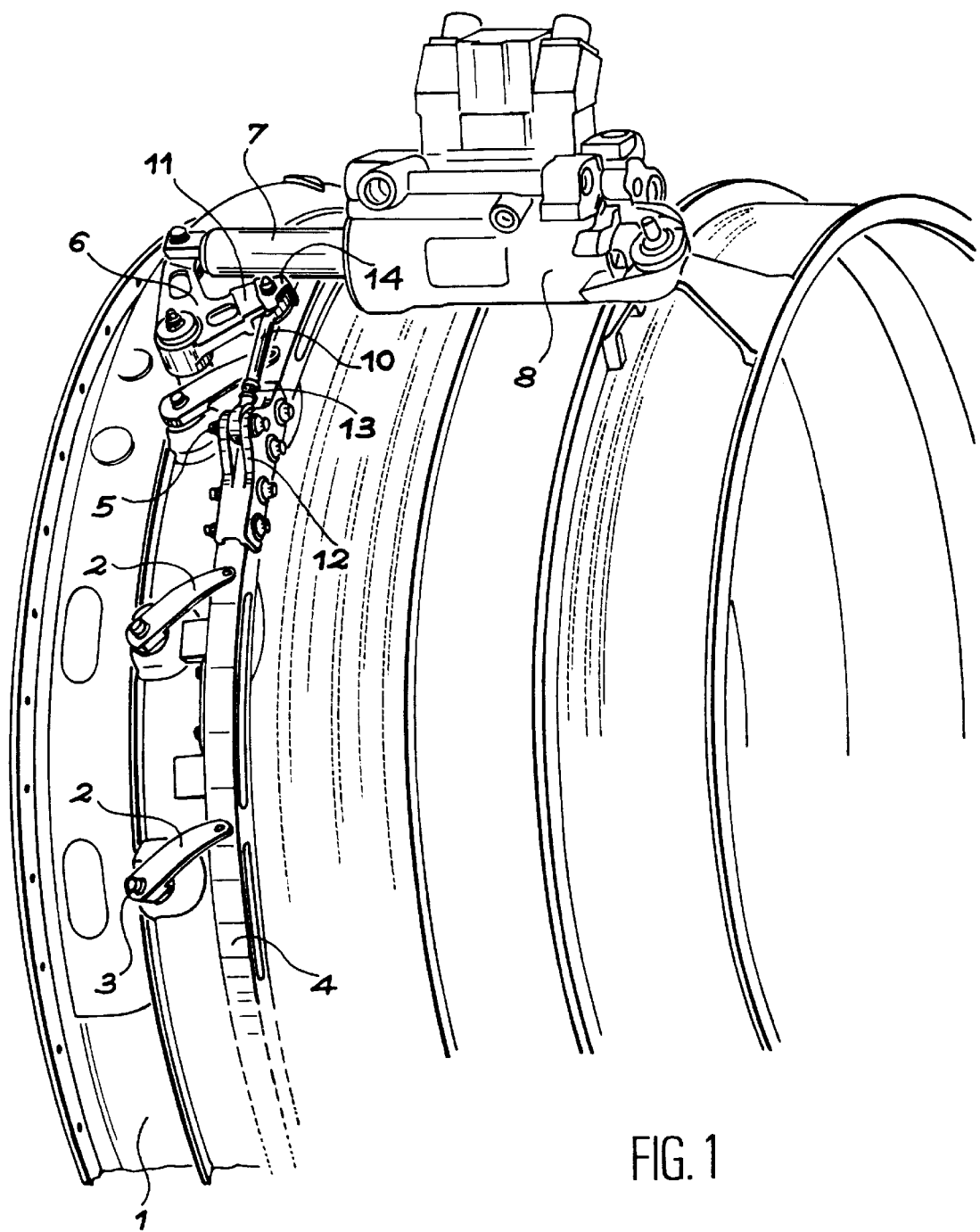
FIG. 1 is a partial perspective view showing the vane control mechanism, seen from the outside, fitted with the protective device according to the present invention.

Referring to FIG. 1, the entrance to a turbojet engine includes an entrance casing 1 to inlet guide-vanes used to adjust the airflow entering the turbojet engine. The inlet guide-vanes include sloping vanes that are not shown but are suggested by the control lever 2 positioned outside the entrance casing 1. They form an integral part of the vanes and each one is mounted to pivot around a pivoting pin of vanes 3 that are perpendicular to the imaginary axis of the turbojet engine. The vanes are sloped using a control actuator 8 positioned outside entrance casing 1 and the piston 7 of which actuates a vane control ring 4 using a pivoting transmission part 6. Control ring 4 surrounds the entire periphery of entrance casing 1. The end of each vane control lever 2 is mounted to pivot around control ring 4 such that each inlet guide-vane pivots around its pin 3 when control ring 4 rotates slightly around entrance casing 1.

A connecting rod 10 transmits the movement of pivoting transmission part 6 to control ring 4. In order to achieve this, the connecting rod is mounted to pivot in a yoke 12 of control ring 4 around a pivoting pin 5 parallel to the axis of the turbojet engine and fastened relative to control ring 4. The other end of connecting rod 10 is also mounted to pivot in a downstream yoke 11 of pivoting transmission part 6.

Figure 2:
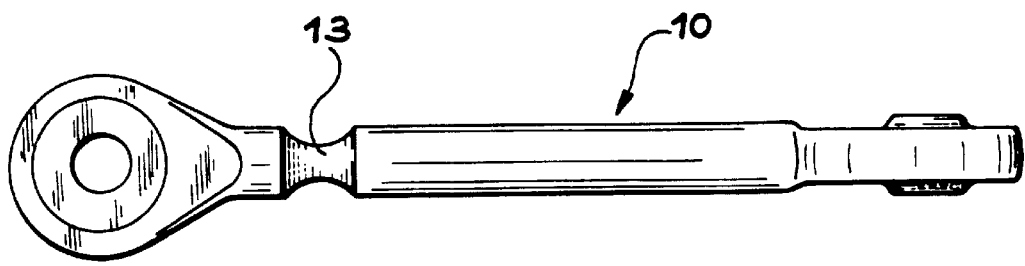
FIG. 2 is a top plan view of a connecting rod of the control mechanism of FIG. 1, wherein the connecting rod constitutes a frangible part.

Referring to FIG. 2, connecting rod 10 is the frangible part and includes a weakened section constituted by a narrowed cross-section 13 of the connecting rod. The reasons for this narrowed cross-section 13 are given above. The result is that an impact or extreme mechanical strain on one of the vanes does not damage control actuator 8. Indeed, in the event of impact, narrowed cross-section 13 is the first part to break in the whole vane control mechanism assembly.

Figure 3:
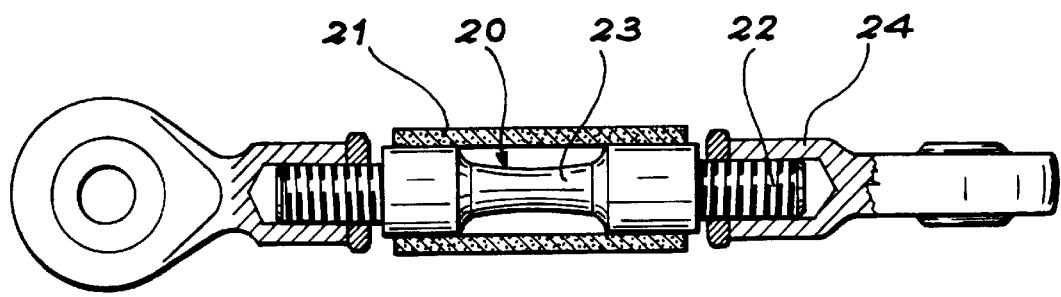
FIG. 3 is a cross-sectional view of another type of connecting rod for use in the vane control mechanism of FIG. 1, wherein the connecting rod constitutes a frangible part and wherein the connecting rod is fitted with a tubular protective part.

Referring to FIG. 3, another embodiment of the connecting rod, reference 20, has a narrowed cross-section 23 protected on the outside by tubular protection 21 preferably consisting of a double-thickness thermoshrinkable sheath.

In FIG. 3, protective part 21 may be transparent to enable the condition of narrowed cross-section 23 to be verified.

It should be noted that the length of the connecting rod may be adjusted due to the two threaded ends 22 that screw into neck 24 of the male section of a yoke.

Figure 4:
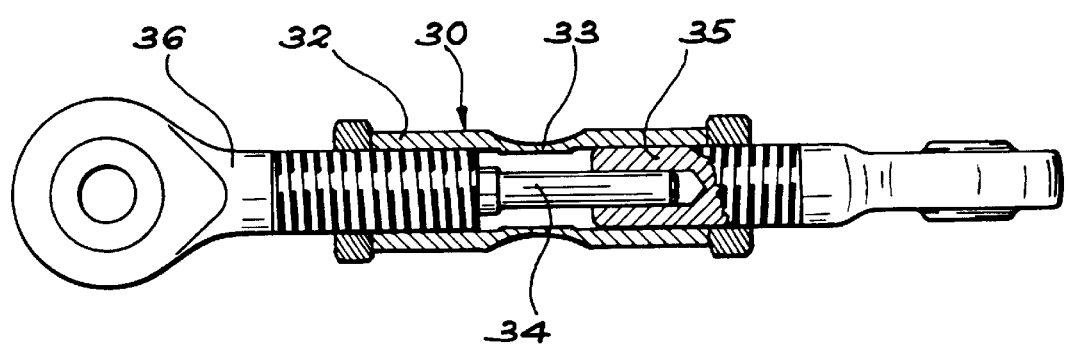
FIG. 4 is a cross-sectional view of another type of frangible connecting rod.

FIG. 4 is another embodiment of the connecting rod, reference 30. It consists of a tubular part 32 that includes a narrowed cross-section 33. It may be noted that the inside of connecting rod 30 is completed by a spindle 34 that forms an integral part of neck 36 of a first male section of a yoke that is housed inside neck 35 of another male section of another yoke. The two necks 35 and 36 are threaded and tubular part 32 is tapped such that the length of the connecting rod can be adjusted by being screwed and unscrewed.

Figure 5:
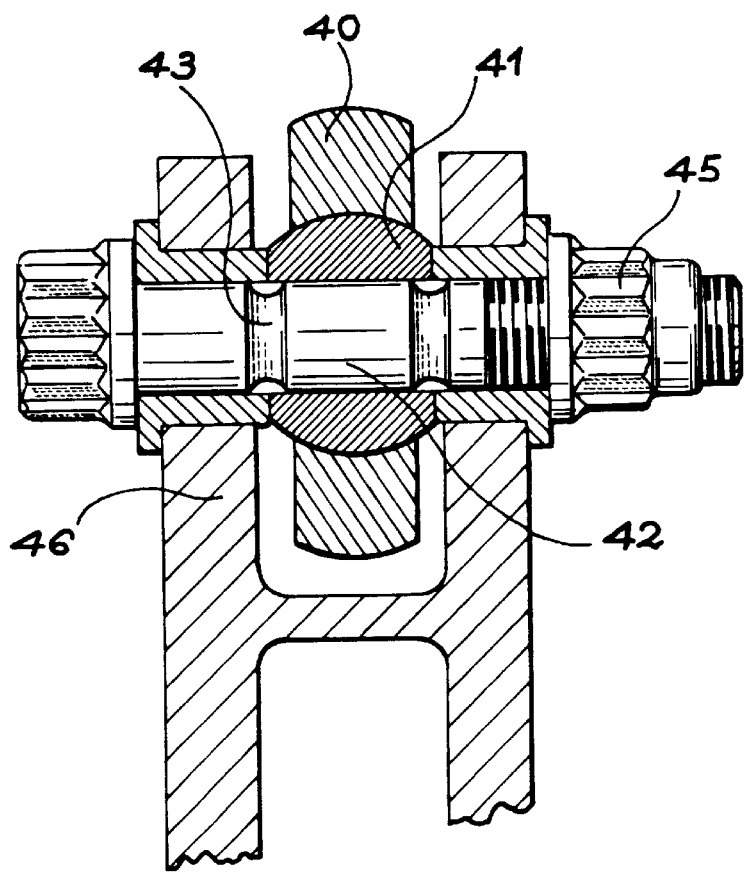
FIG. 5 is a cross-sectional view of a yoke downstream of a pivoting transmission part with a pin used as a frangible part.

Referring to FIG. 5, in another embodiment of the frangible part of the invention, said frangible part is positioned in a frangible bolt 42 of a yoke of the vane control mechanism. Indeed, it is possible to position the frangible part on pivoting pin 5 of FIG. 1 in a yoke between connecting rod 10 and control ring 4. In this embodiment, the connecting rod does not include a narrowed cross-section.

Referring back to FIG. 5, one or two sections with cross-section 43 may be included in bolt 42 that is positioned in the center of the hinge of connecting rod 40 around a ball joint 41. The female section of yoke 46 therefore forms an integral part of the transmission ring. A nut 45 is used to adjust the grip of female section 46 around connecting rod 40 such that ball joint 41 is not subject to play.

Figure 6:
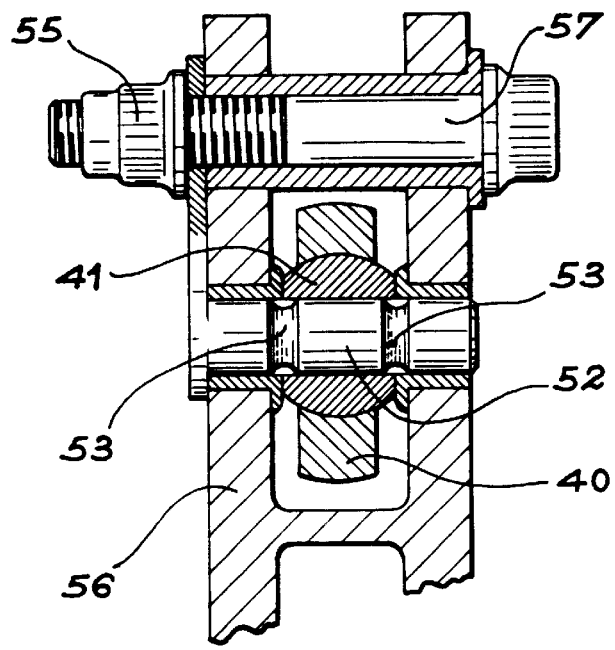
FIG. 6 is a cross-sectional view of the downstream yoke of the pivoting transmission part of FIG. 5, wherein the pivoting transmission part is fitted with means for adjusting play.

FIG. 6 shows another embodiment that enables the play to be adjusted around ball joint 41 of connecting rod 40. In this embodiment the weakened section or sections 53 are positioned on a yoke pin 52 that does not constitute part of a bolt. On the other hand the female section of yoke 56 is extended to enable an adjuster bolt 57 to pass through yoke 56 and an adjuster nut 55 is used to adjust the play around ball joint 41.

Figure 7:
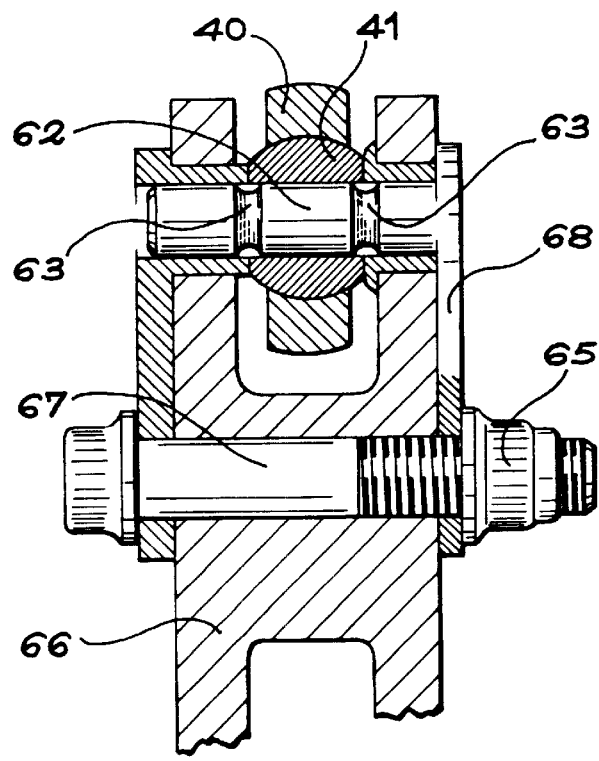
FIG. 7 is a cross-sectional view of another type of means for adjusting play of the downstream yoke of a pivoting transmission part.

FIG. 7 shows still another embodiment for adjusting the play of ball joint 41 of connecting rod 40. Another adjuster bolt 67 is positioned inside the female section of yoke 566 and an adjuster not 65 is used. An end plate 68 is used that forms an integral part of pin 62 which includes one or two weakened sections 63.

FIG. 1 also shows an anti-deflection part 14 positioned around the hinge constituted by the first end of connecting rod 10 and the downstream yoke 11 of pivoting transmission part 6. Indeed, in the event of frangible section 13 of connecting rod 10 breaking, it splits into two sections. It is necessary to prevent the section closest to the actuator, in other words that fastened to downstream yoke 11 of pivoting transmission part 6, from coming to bear on or hitting control actuator 8 or the spindle of piston 7. Anti-deflection part 14 is therefore U-shaped and forms an integral part of the bolt, the pin of yoke 11 or the female section of downstream yoke 11. Said anti-deflection part must cover the end of connecting rod 10 to minimize any deflection.

Figure 9:
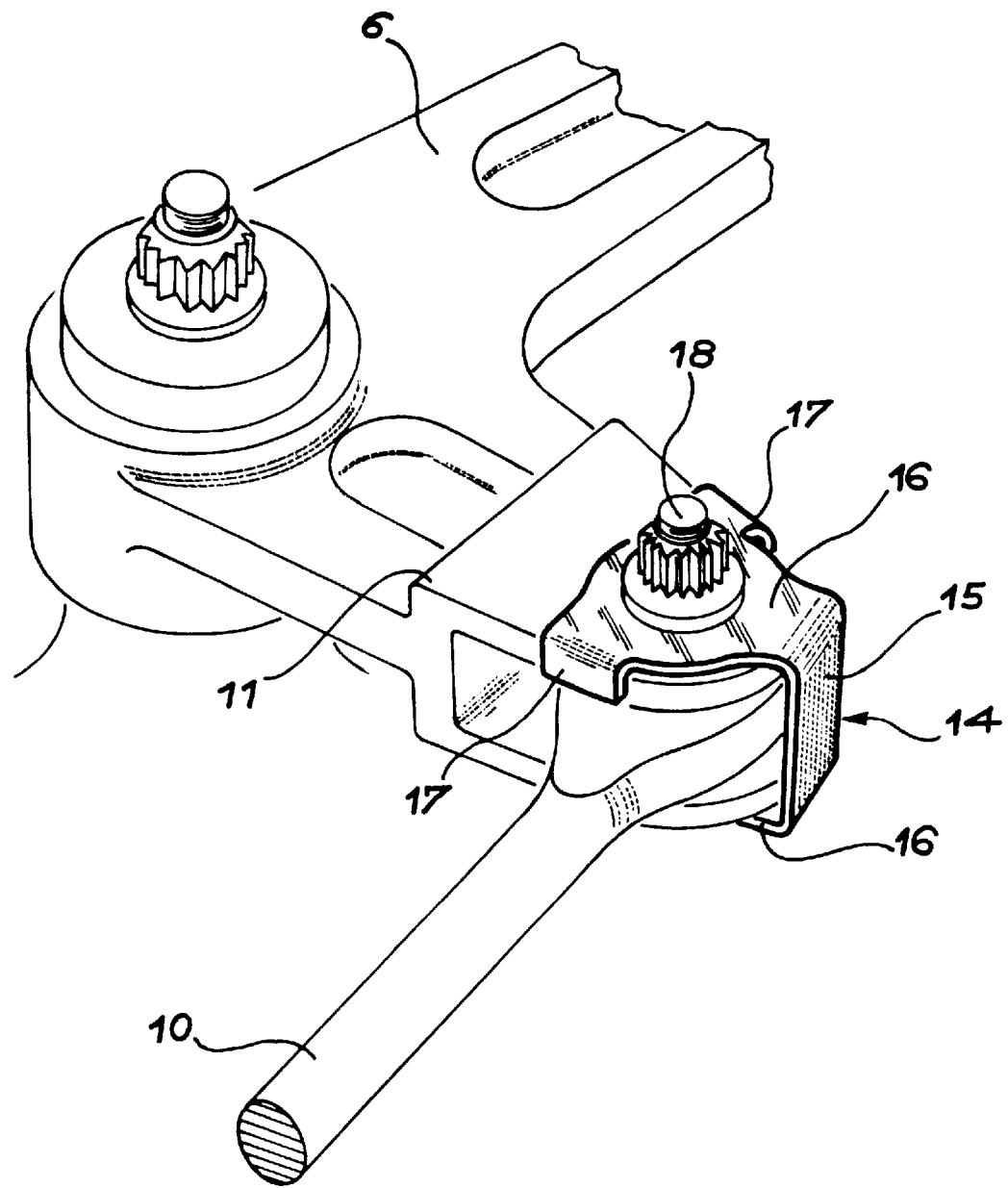
FIG. 9 is a partial perspective view of the anti-deflection part used in conjunction with the protective device of the present invention.

An embodiment of anti-deflection part 14 is shown in detail in FIG. 9. The U shape is mainly constituted by a central section 15 and two arms 16 that are perpendicular to central section 15. The two arms 16 are parallel to each other and are positioned on either side of the head of connecting rod 10. Slight play exists between the head of connecting rod 10 and the three sections of anti-deflection part 14, in other words central section 15 and particularly the two arms 16. Thus, it will be understood that the deflection possibilities of connecting rod 10 relative to yoke 11 of pivoting transmission part 6 to which it is fastened are mainly limited to rotating around fastening pin 18. Positioning feet 17 may be provided on either side of each arm 16 to prevent anti-deflection part 14 from pivoting around fastening pin 18.

Figure 8:
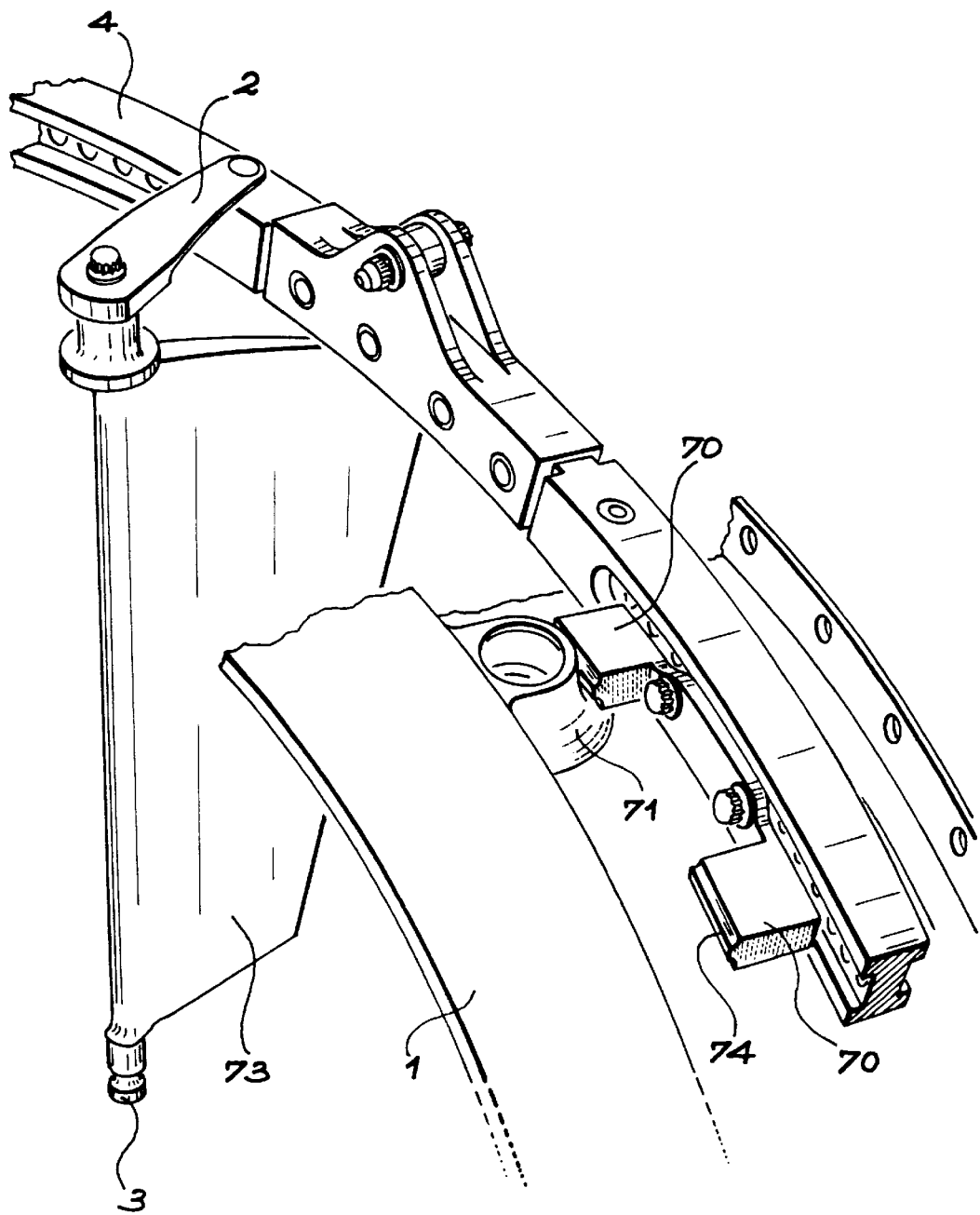
FIG. 8 is a partial perspective view of the positioning stops of the control ring used in conjunction with the protective device according to the present invention.

FIG. 8 shows the position of control ring 4. Indeed, in the event of the connecting rod or frangible bolt being damaged or broken after one of the vanes has been subjected to excessive impact or strain, the control ring is no longer held longitudinally in place relative to the pin of he turbojet engine. In other words, control ring 4 tends to move longitudinally. According to the invention control ring 4 is fitted with lateral stops 70 that are intended to come into contact with a projection 71 provided in entrance casing 1 and intended to position pivoting pin 3 of a vane 73. A lateral stop 71 is provided for both of the extreme positions of transmission ring 4. Furthermore, the end of each lateral stop 70 is advantageously fitted with an apex of damping material 74 to prevent any impact to projections 71.

ADVANTAGES OF THE INVENTION

Whether a narrowed section is used on the connecting rod or on the pin of the yoke the proposed solution is inexpensive as only a single part is necessary in the control mechanism.

It is easy to assemble.

Furthermore, as shown in FIGS. 3 and 4, the length of the connecting rod can be adjusted which facilitates assembly and renders the solution suitable for existing equipment. The solution of the anti-deflection part is relatively simple as it consists in adding a single sheet metal part.

It can be suited to fit parts that already exist around the ball joint of the connecting rod on the head of the pivoting transmission part.

The weight increase is insignificant.

Assembly is easy as the anti-deflection part can be simply clipped into place.

Above all, this solution is very inexpensive.

What is claimed is:

1. A protection device for protecting a control mechanism of a plurality of inlet guide-vanes at an entrance to a turbojet engine, said protection device comprising:
   a direction control actuator;
   a frangible transmission part activated by said direction control actuator;
   a control ring driven by said direction control actuator using said frangible transmission part;
   a control lever for each of said plurality of inlet guide-vanes;
   a control ring actuating each of said control levers, wherein said frangible transmission part is a single component which constitutes a link of said control mechanism positioned between said direction control actuator and said control ring;
   lateral stops fastened laterally to said control ring; and
   a projection used to position a pivoting pin of each of said plurality of inlet guide-vanes, wherein said lateral stops come to bear on said projection.

2. The protection device according to claim 1, wherein said frangible transmission part is a connecting rod which includes a narrowed section, said connecting rod having a first end connected to a pivoting transmission part, said pivoting transmission part being connected to a spindle of said direction control actuator, and said connecting rod having a second end connected to said control ring.

3. The protection device according to claim 2, wherein said connecting rod and said narrowed section are tubular.

4. The protection device according to claim 2, wherein said connecting rod includes a protective part surrounding said narrowed section.

5. The protection device according to claim 4, wherein said protective part is a double-thickness thermoshrinkable sheath.

6. The protection device according to claim 2, further comprising an anti-deflection part fastened to a downstream yoke of said pivoting transmission part, wherein said anti-deflection part covers either said first end or said second end of said connecting rod to prevent said connecting rod from rotating at an amplitude which would cause an impact to either said direction control actuator or to said spindle of a piston extending outwardly from said direction control actuator if said narrowed section were weakened and broke.

7. The protection device according to claim 1, further comprising a frangible pin which includes at least one narrowed cross-section of a yoke of said control mechanism of said plurality of inlet guide-vanes.

8. A protection device for protecting a control mechanism of a plurality of inlet guide-vanes at an entrance to a turbojet engine, said protection device comprising:
   a direction control actuator;
   a frangible transmission part activated by said direction control actuator;
   a control ring driven by said direction control actuator using said frangible transmission part;
   a control lever for each of said plurality of inlet guide-vanes;
   a control ring actuating each of said control levers, wherein said frangible transmission part is a single component which constitutes a link of said control mechanism positioned between said direction control actuator and said control ring, and wherein said frangible transmission part is a connecting rod which includes a narrowed section, said connecting rod having a first end connected to a pivoting transmission part, said pivoting transmission part being connected to a spindle of said direction control actuator, and said connecting rod having a second end connected to said control ring.

9. The protection device according to claim 8, wherein said connecting rod and said narrowed section are tubular.

10. The protection device according to claim 8, wherein said connecting rod includes a protective part surrounding said narrowed section.

11. The protection device according to claim 10, wherein said protective part is a double-thickness thermoshrinkable sheath.

12. The protection device according to claim 10, further comprising lateral stops fastened laterally to said control ring and a projection used to position a pivoting pin of each of said plurality of inlet guide-vanes, wherein said lateral stops come to bear on said projection.

13. The protection device according to claim 9, further comprising a frangible pin which includes at least one narrowed cross-section of a yoke of said control mechanism of said plurality of inlet guide-vanes.

14. The protection device according to claim 9, further comprising an anti-deflection part fastened to a downstream yoke of said pivoting transmission part, wherein said anti-deflection part covers either said first end or said second end of said connecting rod to prevent said connecting rod from rotating at an amplitude which would cause an impact to either said direction control actuator or to said spindle of a piston extending outwardly from said direction control actuator if said narrowed section were weakened and broke.

* * * * *